United States Patent [19]

Johnson

[11] Patent Number: 4,970,596
[45] Date of Patent: Nov. 13, 1990

[54] PSEUDO LINE LOCKED WRITE CLOCK FOR PICTURE-IN-PICTURE VIDEO APPLICATIONS

[75] Inventor: Larry D. Johnson, Kingsport, Tenn.

[73] Assignee: North American Philips Corp., New York, N.Y.

[21] Appl. No.: 241,514

[22] Filed: Sep. 7, 1988

[51] Int. Cl.$^5$ ............................................. H04N 5/275
[52] U.S. Cl. ..................... 358/183; 358/22; 358/149
[58] Field of Search .............. 358/183, 149, 22, 182, 358/148

[56] References Cited

U.S. PATENT DOCUMENTS

| | | | |
|---|---|---|---|
| 3,984,633 | 10/1976 | Rutt | 358/183 |
| 4,199,788 | 4/1980 | Tsujimura | 358/183 |
| 4,228,433 | 10/1980 | Matsumoto | 358/183 |
| 4,238,773 | 12/1980 | Tsuboka et al. | 358/183 |
| 4,617,594 | 10/1986 | Katagiri | 358/150 |
| 4,665,438 | 5/1987 | Miron | 358/183 |
| 4,736,162 | 4/1988 | Ishihara | 358/148 |

Primary Examiner—Tommy P. Chin
Attorney, Agent, or Firm—Emmanuel J. Lobato

[57] ABSTRACT

The write clock controlling operation of the PIP circuitry (e.g. the analog digital converter in the PIP channel) utilizes a clock signal source having a substantially higher frequency (preferably six times) the desired write clock frequency. This clock signal is applied to a divide by six circuit which has a cycle reset controlled by the horizontal synchronization signal of the incoming PIP signal. The write clock signal furnished by this arrangement has the correct rate for sampling the incoming PIP video information and is pseudo line locked to the PIP horizontal synchronization signal.

20 Claims, 2 Drawing Sheets

| | R | C1 | C2 | C3 | C4 | C5 | C6 | C7 | C8 |
|---|---|---|---|---|---|---|---|---|---|
| J62 | 1 | 1 | 0 | 1 | 1 | 0 | 1 | 1 | 0 |
| Q62 | 0 | 1 | 0 | 0 | 1 | 0 | 0 | 1 | 0 |
| J64 | 0 | 0 | 0 | 0 | 1 | 0 | 0 | 1 | 0 |
| Q64 | 0 | 1 | 1 | 0 | 0 | 1 | 1 | 0 | 1 |
| $\overline{Q64}$ | 1 | 0 | 0 | 1 | 1 | 0 | 0 | 1 | 0 |
| D66 | 1 | 1 | 1 | 1 | 1 | 1 | 0 | 1 | 0 |
| Q66 | 0 | 0 | 0 | 0 | 1 | 1 | 1 | 1 | 0 |
| $\overline{Q66}$ | 1 | 1 | 1 | 1 | 0 | 0 | 0 | 0 | 1 |
| CL66 | — | up | down | — | up | down | — | up | down |

PSEUDO LINE LOCKED WRITE CLOCK FOR PICTURE-IN-PICTURE VIDEO APPLICATIONS

BACKGROUND

The present invention generally relates to clock generators for capturing picture-in-picture (PIP) images for video signals. More particularly, the present invention relates to a pseudo line locked clock generator for capturing PIP images for both standard and non-standard video signals.

In generating a PIP television image, it is standard to use a "write" clock for capturing the TV images from transmitted signals. The write clock is used to control the analog/digital conversion sample rate as well as to control the writing of the A/D converted signals into the addresses of a memory. In addition, the write clock controls the incoming data sequencing and compression of chrominance data. Once the data is stored at desired addresses in memory, a separate "read" clock is utilized to read the PIP date into the video data stream being sent to the television. The read clock controls the reading of digital signals from the memory as well as the conversion rate of the D/A converter. In addition, the read clock controls the outgoing data sequencing and expansion of the compressed chrominance data.

Because the video signal being captured for PIP display is typically independent of the main video signal which is to be displayed, the PIP write and read clocks are typically asynchronous. The two separate clocks are typically generated via the use of gated oscillators, line locked phase locked loop (PLL) circuits, or burst locked PLL circuits. Regardless of how generated, the use of two separate clocks has various drawbacks. Gated oscillator clocks often result in frequency instability resulting in the requirement that the PIP control integrated circuit must be designed to operate with the clock being off during part of each horizontal line. The line locked PLL clock, on the other hand, is stable, but is expensive to implement and is subject to frequency jitter. The burst locked PLL clock is also expensive to implement and does not operate well with non-standard signals such as might be generated by a VCR.

SUMMARY OF THE INVENTION

In light of the drawbacks of the clocking alternatives for PIP applications, it would be advantageous to produce a stable, inexpensive circuit which could replace the write clock. It is therefore the primary object of the invention to provide a stable, inexpensive pseudo line locked circuit utilizing an available clock asynchronous to the incoming PIP video signals for acting as a PIP write clock. It is a further object of the invention to provide a pseudo line locked circuit for use as a PIP write clock which introduces substantially no visible artifacts into the PIP display.

In accord with the object of the invention, a simple PIP write clock which does not introduce visible artifacts comprises a dividing means for receiving and dividing by at least six a clock input asynchronous to incoming PIP video information which is at least six times the speed of the incoming PIP video information. The dividing means includes a cycle reset coupled to the horizontal synchronization signal of the incoming PIP video information, such that the clock signal output is at the rate of the incoming PIP video information and is pseudo line locked to the horizontal synchronization signal. Because the provided pseudo line locked PIP write clock causes data to be written at one sixth or less of a cycle out of sync with the horizontal sync signal, and because the PIP image is small (typically one-ninth the original screen size), substantially no visible artifacts are introduced into the PIP image.

In accord with a further aspect of the invention, a horizontal synchronization leading edge pulse generator is provided for taking the horizontal synchronization signal and providing a stable leading edge pulse which may be reliably used as a horizontal reset for the divider means. Of course, where the trailing edge of the horizontal sync signal is stable, the horizontal sync signal may be directly used as a reset.

Additional objects, features, and advantages of the invention will become apparent to those skilled in the art upon reference to the following detailed description of the invention and the accompanying drawings.

DETAILED DESCRIPTION OF THE PREFERRED EMBODIMENT

Figure 1:
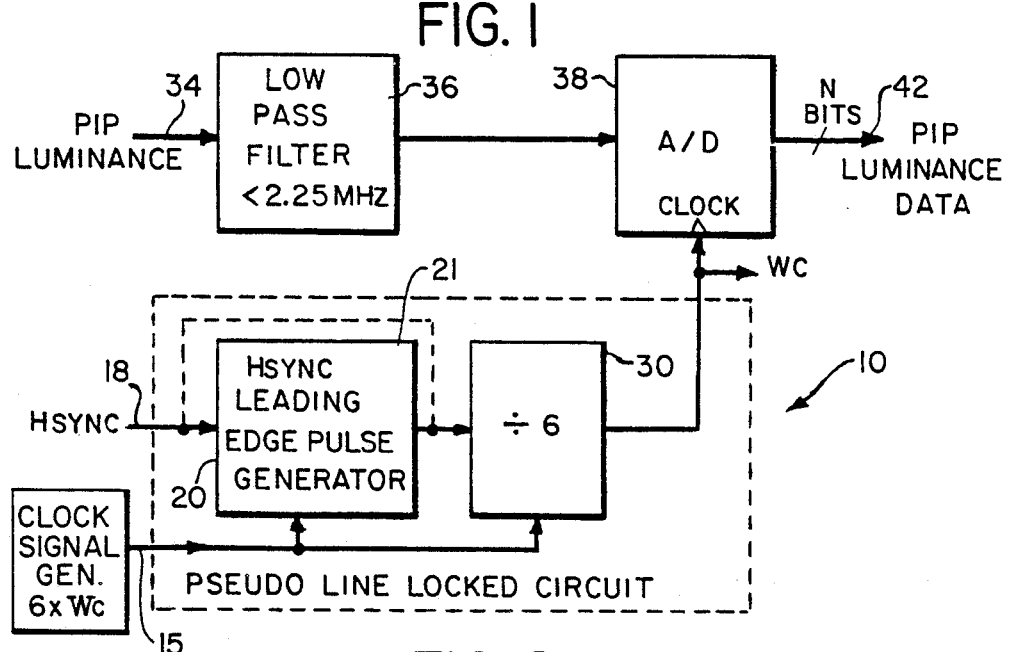
FIG. 1 is a block diagram of the write clock circuit of the invention shown in conjunction with typical blocks for receiving and processing PIP luminance data.

Turning to FIG. 1, a block diagram of the write clock 10 of the invention is seen in conjunction with the A/D conversion of PIP luminance data for storing in memory. The inputs into the write clock circuit 10 include a fast clock 15 of at least six times the speed ($6 \cdot W_c$) of the desired write clock, and a horizontal synchronization signal 18. Both the fast clock 15 and the horizontal synchronization signal are fed to the horizontal synchronization leading edge pulse generator 20 which generates a horizontal reset pulse ($H_{reset}$). The output reset pulse of the generator 20 and the fast clock are both input into the dividing means 30 which divides the fast clock rate by at least six, and provides a pseudo line locked clock of desired rate $W_c$. The write clock, while not exactly synchronized to the incoming PIP data 34, is pseudo line locked to the horizontal synchronization signal and hence the incoming data. Thus, the incoming data 34, which is filtered by standard low pass filter 36, is fed to A/D converter 38 whose conversion sample rate is controlled by the generated clock of desired rate $W_c$. The converted data is then sent over N bit bus 42 to a memory such as a RAM (not shown) where it is stored until being read into a main video data stream.

While FIG. 1 is indicative of PIP luminance processing, it should be appreciated that chrominance processing is accomplished in an identical manner. Further, while a fast clock 15 of six times the desired write clock signal $W_c$ is seen in conjunction with a divider 30 which divides by six, the division by the dividing means is set to correspond to the fast clock rate; i.e. if the fast clock is ten times faster than the desired write clock speed, the divider is arranged to be a divider by ten. In fact, the fast clock may thought of as being at a rate n $W_c$, where n is preferably greater than or equal to six. The divider means is then correspondingly arranged to divide by n.

Also, as indicated in FIG. 1, while the horizontal sync leading edge pulse generator 20 is preferably provided, if the trailing edge of the horizontal synchronization signal 18 is sufficiently stable, the generator 20 may be dispensed with and the signal 18 may be used directly as an input into the divider means. This is indicated by the signal path 21 shown as a dashed line.

Figure 2:
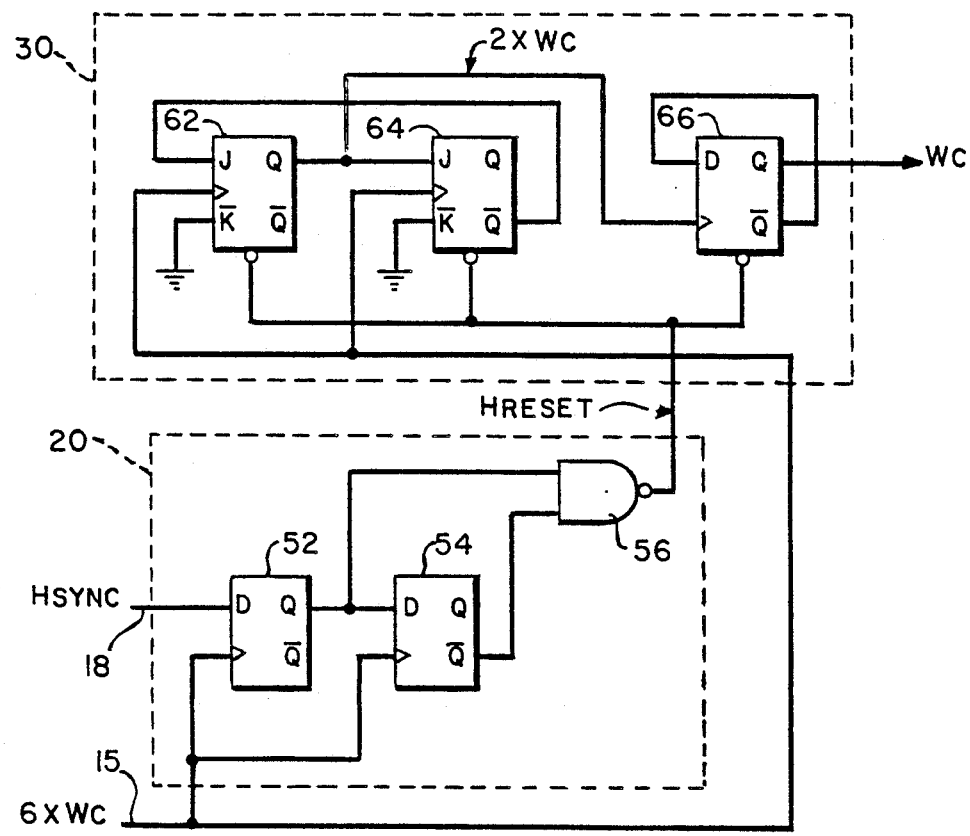
FIG. 2 is a circuit diagram of the preferred write clock circuit of the invention including a leading edge pulse generator and a divide by six means.

Details of the divider means 30 and the leading edge pulse generator 20 are seen in FIG. 2. The pulse generator 20 is preferably comprised of two DQ flip-flops 52 and 54, and a NAND gate 56. The fast clock signal is used as an input into both DQ flip-flops with the D input of flip-flip 52 having the horizontal synchronization as an input thereto, and the Q output of flip-flop 52 connected to the D input of flip-flop 54. The inputs into NAND gate 56 are the Q output of flip-flop 52 and the not Q output of flip-flop 54. With the provided arrangement, whatever is at the D input of flip-flop 52 is gated to its Q output at the leading edge of the fast clock. Thus, if the $H_{sync}$ signal 18 is zero, at the leading edge of fast clock 15, a zero is transferred to the Q output of flip-flop 52. With a zero at the Q output of flip-flop 52, a one appears at the not Q output of flip-flop 54 after a second leading edge of clock 15. With a zero and a one being input to NAND gate 56, NAND gate 56 outputs a one value which does not reset the flip-flops of divider 30.

Upon the horizontal synchronization signal 18 going high, flip-flop 52 outputs a one at the Q output at the leading edge of the fast clock. However, flip-flop 54 remains static for one fast clock cycle. Thus, at the first cycle of fast clock 15 after signal 18 goes high, NAND gate receives two high inputs and outputs a zero to the divider means 30. This zero acts as a reset of the divider means. At the next positive edge of fast clock 15, flip-flop 54 changes state to produce a zero on the not Q output, resulting in NAND gate 56 again outputting a one value. Hence, it will be appreciated that the horizontal reset signal lasts one cycle of fast clock 15, and then only when the horizontal sync signal 18 goes from zero to one. These transitions may be seen with reference to FIG. 4.

Turning to the divider 30, it will be appreciated that the function of the divider is to take the fast clock signal 15, divide the same by a desired amount, and generate a desired write clock signal $W_c$. In the preferred embodiment, the divide by six divider 30 utilizes two $J\overline{K}$ flip-flops 62 and 64, and a DQ flip-flop 66. Each flip-flop of the divider 30 has a reset port coupled to the output of NAND gate 56. $J\overline{K}$ flip-flops 62 and 64 have their not K inputs tied to ground; i.e. a zero value, and their clock inputs coupled to the fast clock 15. The Q output of flip-flop 62 is coupled to the J input of flip-flop 64 and the clock input of DQ flip-flop 66. The not Q output of flip-flop 64 is coupled to the J input of flip-flop 62. The not Q output of flip-flop 66 is coupled to the D input thereof, while the Q output of flip-flop 66 is the desired $W_c$ signal.

Figures 3, 4:
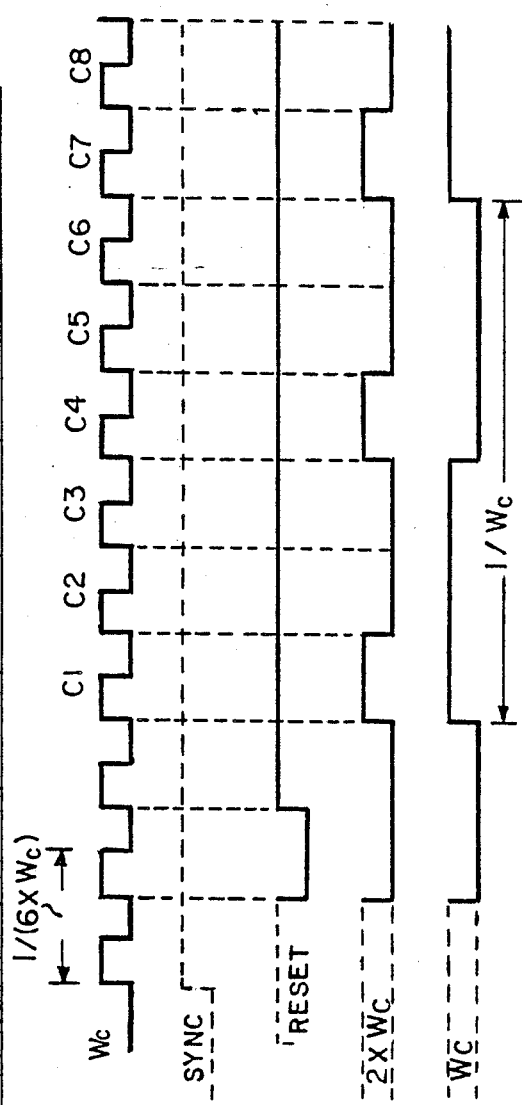
FIG. 3 is a logic chart showing the values at different flip-flop ports of the divide by six means.
FIG. 4 is a timing diagram of the pseudo line locked write clock circuit.

In operation, and as indicated in the logic chart of FIG. 3, when the flip-flops 62, 64, and 66 are reset, the Q output of flip-flop 62 is zero, the not Q output of flip-flop 64 is one, the Q output (clock $W_c$) of flip-flop 66 is zero, and the not Q output of flip-flop 66 is one. At the next fast clock pulse (when the reset goes high) the one value at the J input to flip-flop 62 (from the not Q of flip-flop 64) toggles the Q output of flip-flop 62 causing the J input to flip-flop 64 to go to a value of one. The not Q output of flip-flop 64 does not change. However, because of the rising pulse at the Q output of flip-flop 62, DQ flip-flop 66 is toggled, with the one value at the D input being transferred to the Q output, and the not Q output and the D input going to zero. Hence, as seen in FIG. 4, at the first fast clock pulse (C1) after reset, the output of divider 30 is high (i.e. value one).

At the next fast clock pulse (C2), flip-flops 62 and 64 toggle as their J inputs are high. Hence, the Q output of flip-flop 62 and the J input to flip-flop 64 go low, while the not Q output of flip-flop 64 and the J input to flip-flop 62 stay low. During pulse C2, flip-flop 66 is inactive, as no rising edge pulse is received from the Q output of flip-flop 62.

At cycle C3, the Q output of flip-flop 62 remains low as the J input was low at cycle C2. Because flip-flop 64 has a low J input, but a high Q output, the Q output of flip-flop 64 is forced low, resulting in the not Q output of flip-flop 64 and the J input to flip-flop 62 going high. Again, because no rising edge is seen at the clock input to DQ flip-flop 66, the DQ flip-flop remains static.

At cycle C4, the high value at the J input to flip-flop 62 toggles the Q output of flip-flop 62 and causes the J input to flip-flop 64 to go to a logic one (high). The outputs of flip-flop 64 remain the same. However, because of the rising value at the Q output of flip-flop 62, flip-flop 66 is toggled, with the zero value at the D input being transferred to the Q output, and the D and not Q values going to one. Hence, at cycle C4, after three fast clock cycles, the output of divider 30 goes low. This output pulse lasting three fast clock cycles is seen in FIG. 4.

Those skilled in the art will appreciate (as shown in FIG. 3) that the provided circuitry continues to cause the Q output of flip-flop 66 to provide a low output for three fast clock cycles. Then at fast clock C7, the output changes to a value of one again for three clock cycles. Thus, the output of divider 30 is a write clock having a cycle equal to the length of six fast clock cycles, with a high value for three fast clock cycles and a low value for three fast clock cycles. Again, this result is seen graphically in FIG. 4. The provided write clock is also pseudo locked to the horizontal synchronization signal input 18 as the horizontal synchronization signal causes the reset signal to toggle within one fast clock cycle. In turn, the reset signal causes the generated write clock to start its cycle. In fact, because the generated write clock goes low for two complete fast clock cycles after the horizontal synchronization signal goes high (starting at the first fast clock leading edge following the horizontal sync signal), it will be appreciated that the generated clock is at most $(1/6) \cdot W_c$ out of phase, and at average $(1/12) \cdot W_c$ out of phase with the incoming data. It has been found that such a phase difference does not introduce substantially visible artifacts in a standard PIP display; i.e. where the PIP is one-ninth a screen size for standard television signals.

As indicated in FIG. 4, another clock at a write of $2 \cdot W_c$ may also be generated if desired. The $2 \cdot W_c$ clock may be taken from the Q output of flip-flop 62 and is particularly useful for color PIP applications where it provides timing for a (R-Y)-(Y)-(B-Y)-(Y) or a (B-Y)-(Y)-(R-Y)-(Y) sequence which samples luminance at the $W_c$ rate.

There has been described and illustrated herein a pseudo line locked write clock for PIP applications. While a particular embodiment of the invention has been described, it is not intended that the invention be limited thereby as it is intended that the invention be as broad in scope as the art will allow and that the specifications be read likewise. Thus, while a clock input of six times the desired write clock speed and a divide by six means were described, those skilled in the art will appreciate that other clock input speeds and corresponding dividing means could be utilized provided that substantially no visible artifacts are introduced into the resulting PIP display. While a clock input speed substantially equal to or greater than six times the speed of the desired write clock to be generated has been found to substantially eliminate artifacts in a PIP display of one-ninth a standard screen, it is within possibility that acceptable PIP displays might be generated even where a pseudo line-line locked write clock generated from fast clocks between six and four and even less than four times the desired write clock speed are utilized. Indeed, those skilled in the art could make such determinations without undue experimentation and without new invention. Further, it will be appreciated that the visibility of artifacts in the PIP display will also be somewhat dependent on the actual size of the PIP display as well as the resolution of the same. All other things being equal, the larger the PIP display on the screen, the easier it will be to view artifacts. Hence, in choosing a fast clock which is to be divided down to the desired write clock speed, the size and resolution of the PIP display as well as the fast clock may all affect the likelihood of visible artifacts appearing. However, again, it is well within the ability of those skilled in the art given the disclosure herein to tailor the fast clock speed to the other circumstances so as to substantially eliminate visible artifacts from the generated PIP display.

While particular circuitry was disclosed for the divider means, it will be appreciated that other circuitry accomplishing the same would be well within the abilities of one skilled in the art. Similarly, those skilled in the art could provide different means for creating an edge (positive or negative) pulse generator, and the leading edge pulse generator described is only one of many circuits that could be utilized to create a reset pulse for the divider means. Further, it should be appreciated that the generated write clock can be utilized for any of many purposes, including but not limited to controlling the A/D conversion sample rate of the incoming PIP data, and controlling data compression of chrominance data. Indeed, the generated write clock is for use with one or both of chrominance and luminance information, in any of many formats, as is required for the particular circumstances. Finally, it will be appreciated that methods for generating a write clock for PIP video information which is pseudo line locked to the incoming PIP information will suggest themselves to those skilled in the art and will be closely connected with the disclosed write clock means. Therefore, it will be apparent to those skilled in the art that other changes and modifications may be made to the invention as described without departing from the spirit and scope of the invention as so claimed.

I claim:

1. An apparatus for generating a write clock of a predetermined write clock frequency for clocking the transfer of PIP video information, comprising:
   a dividing means including
      means for receiving a clock input signal asynchronous to said PIP video information where the clock input signal frequency is at least n times said predetermined write clock frequency,
      means for dividing said clock input signal by said value n to provide an output of said predetermined write clock frequency, and
   reset means coupled to a horizontal synchronization signal associated with said PIP video information for resetting said means for dividing said clock input signal,
   wherein said value n is greater than one and is chosen such that substantially visible artifacts are not introduced into a PIP display generated from said PIP video information, and
   wherein said predetermined write clock frequency output is pseudo line locked to said horizontal synchronization signal.

2. An apparatus according to claim 1, wherein:
   said value n is substantially equal to or greater than six.

3. An apparatus according to claim 2, wherein:
   said value n equals six such that said frequency of said clock input signal is approximately six times said predetermined write clock frequency, and said means for dividing divides said clock input signal by six.

4. An apparatus according to claim 3, wherein:
   said means for dividing comprises a first $J\overline{K}$ flip-flop, a second $J\overline{K}$ flip-flop, and a first DQ flip-flop, wherein a not Q output of said second $J\overline{K}$ flip-flop is coupled to a J input of said first $J\overline{K}$ flip-flop, a Q output of said first $J\overline{K}$ flip-flop is coupled to a J input of said second $J\overline{K}$ flip-flop, a clock input to said first DQ flip-flop is coupled to said Q output of said first $J\overline{K}$ flip-flop, a not Q output of said first DQ flip-flop is coupled to a D input of said first DQ flip-flop, a not K input of said first and second $J\overline{K}$ flip-flops are arranged to be maintained in a low state, and a Q output of said first DQ flip-flop furnishes said output clock signal.

5. An apparatus according to claim 4, wherein:
   said reset means comprises reset inputs to said first and second $J\overline{K}$ flip-flops and said first DQ flip-flop, wherein when said reset means resets said first and second $J\overline{K}$ flip-flops and said first DQ flip-flop, said Q output of said first $J\overline{K}$ flip-flop goes low, said not Q output of said second $J\overline{K}$ flip-flop goes high, and said Q output of said first DQ flip-flop goes low.

6. An apparatus according to claim 5, wherein:
   said reset means resets said first and second $J\overline{K}$ flip-flops and said first DQ flip-flop after a trailing edge of said horizontal synchronization signal.

7. An apparatus according to claim 1, further comprising:
   edge pulse generator means connected to said reset means for receiving said preselected horizontal synchronization signals and for providing reset pulses to said reset means after respective leading edges of said preselected horizontal synchronization signals.

8. An apparatus according to claim 7, wherein:
   said edge pulse generator means comprises first and second DQ flip-flops and a NAND gate, wherein a D input to said first DQ flip-flop is coupled to receive said preselected horizontal synchronization signals, a Q output of said first DQ flip-flop is coupled to a D input to said second DQ flip-flop and a first input to said NAND gate, a not Q output of said second DQ flip-flop is coupled to a second input to said NAND gate, clock inputs into said first and second DQ flip-flops are coupled to receive said clock input signal, and an output of said NAND gate provides said reset pulse to said reset means.

9. An apparatus according to claim 5, further comprising:
edge pulse generator means connected to said reset means for receiving said preselected horizontal synchronization signals and for providing reset pulses to said reset means after respective leading edges of said preselected horizontal synchronization signals.

10. An apparatus according to claim 9, wherein:
said edge pulse generator means comprises second and third DQ flip-flops and a NAND gate, wherein a D input to said second DQ flip-flop is coupled to receive said preselected horizontal synchronization signals, a Q output of said second DQ flip-flop is coupled to a D input to said third DQ flip-flop and a first input to said NAND gate, a not Q output of said third DQ flip-flop is coupled to a second input to said NAND gate, clock inputs into said second and third DQ flip-flops are coupled to said clock input signal, and an output of said NAND gate provides said reset pulse to said reset means.

11. A method for generating a write clock of predetermined write clock frequency for PIP video information, comprising:
(a) obtaining a clock signal having a frequency at least n times as great as said predetermined write clock frequency;
(b) inputting said obtained clock signal into a divider means capable of dividing said obtained clock signal by said value n down to said predetermined write clock frequency; and
(c) coupling a horizontal synchronization signal associated with said PIP video information to said divider means such that an edge of said horizontal synchronization signal resets said divider means so that said divider means is pseudo line locked to said horizontal synchronization signal.

12. A method according to claim 11, further comprising:
(d) choosing said value n such that substantially visible artifacts are not introduced into a PIP display generated from said provided PIP video information.

13. Apparatus for generating an output clock signal synchronized to preselected horizontal synchronization signals and having a predetermined output clock frequency for clocking the transfer of video information, comprising:
means for generating a clock input signal asynchronous to said preselected horizontal synchronization signals and having a clock input signal frequency at least n times said predetermined output clock frequency, where said values n is substantially greater than one;
divider means for dividing said clock input signal by said value n to provide a divider output signal having said predetermined output clock frequency; and
reset means connected to said divider means and coupled to receive said preselected horizontal synchronization signals for resetting said divider means in response to each of said preselected horizontal synchronization signals, whereby said divider output signal constitutes said output clock signal.

14. Apparatus according to claim 13, wherein:
said video information is picture-in-picture (PIP) information having associated PIP horizontal synchronization signals; and
wherein said PIP horizontal synchronization signals constitute said preselected horizontal synchronization signals.

15. Apparatus according to claim 14, wherein:
said value n is equal to or greater than six.

16. Apparatus according to claim 13, wherein:
said preselected horizontal synchronization signals have respective trailing edges; and
wherein said reset means resets said divider means in response to said trailing edges of said preselected horizontal synchronization signals.

17. Apparatus according to claim 13, further comprising:
edge pulse generator means connected to said reset means for receiving said preselected horizontal synchronization signals and for providing reset pulses to said reset means after respective leading edges of said preselected horizontal synchronization signals.

18. Apparatus according to claim 17, wherein:
said divider means comprises a first $J\overline{K}$ flip-flop, a second $J\overline{K}$ flip-flop, and a first DQ flip-flop, wherein a not Q output of said second $J\overline{K}$ flip-flop is coupled to a J input of said first $J\overline{K}$ flip-flop, a Q output of said first $J\overline{K}$ flip-flop is coupled to a J input of said second $J\overline{K}$ flip-flop, a clock input to said DQ flip-flop is coupled to said first Q output of said first $J\overline{K}$ flip-flop, a not Q output of said first DQ flip-flop is coupled to a D input of said first DQ flip-flop, a not K input of said first and second $J\overline{K}$ flip-flops are arranged to be maintained in a low state, and a Q output of said first DQ flip-flop furnishes output clock signal.

19. A method for generating an output clock signal synchronized to preselected horizontal synchronization signals and having a predetermined output clock frequency for clocking the transfer of video information, comprising the steps of:
generating a clock input signal synchronous to said preselected horizontal synchronization signals and having a clock input signal frequency at least n times said predetermined output clock frequency, where said value n is substantially greater than one;
dividing said clock input signal by said value n thereby providing a divider output signal having said predetermined output clock frequency; and
restarting said dividing step in response to each of said preselected horizontal synchronization signals, whereby said divider output signal constitutes said output clock signal.

20. A method according to claim 19, wherein said value n is at least six.

* * * * *